Aug. 13, 1929.                H. HONIGMANN                1,724,588
                              DRIVE MECHANISM
                          Filed Aug. 14, 1926              2 Sheets-Sheet 2
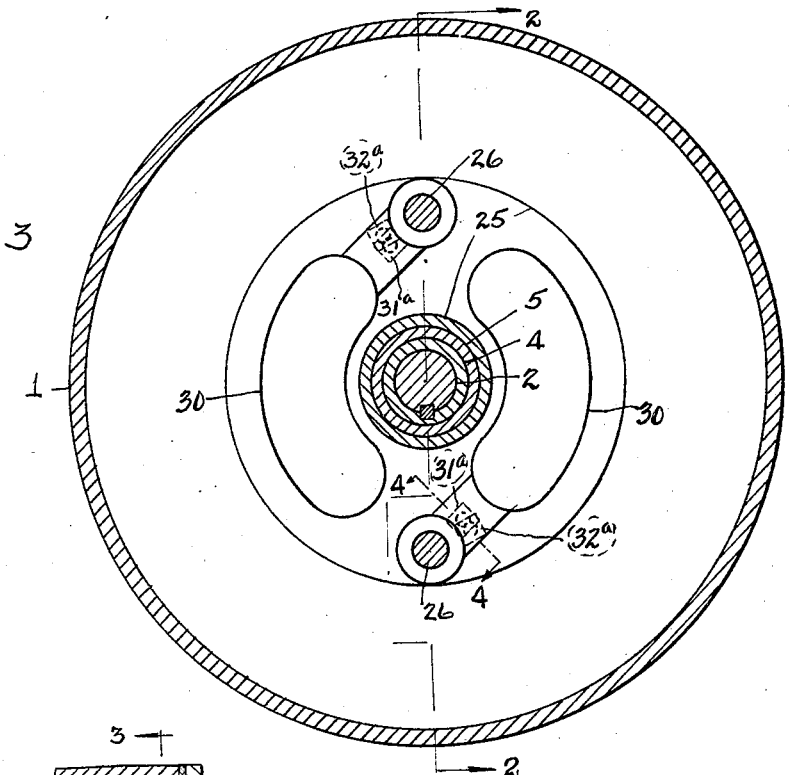
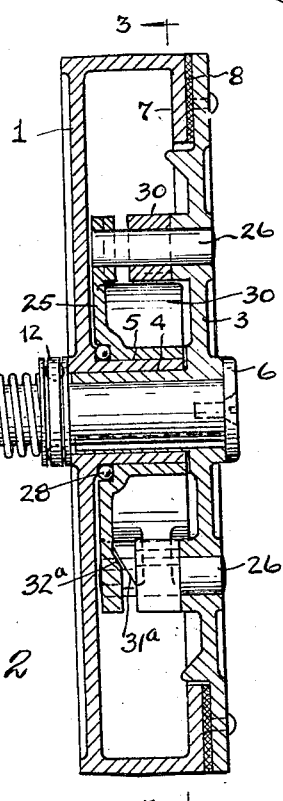
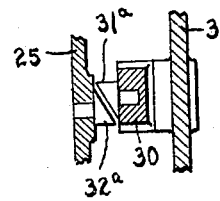
INVENTOR.
Hans Honigmann
BY Fay, Oberlin & Fay
ATTORNEYS.

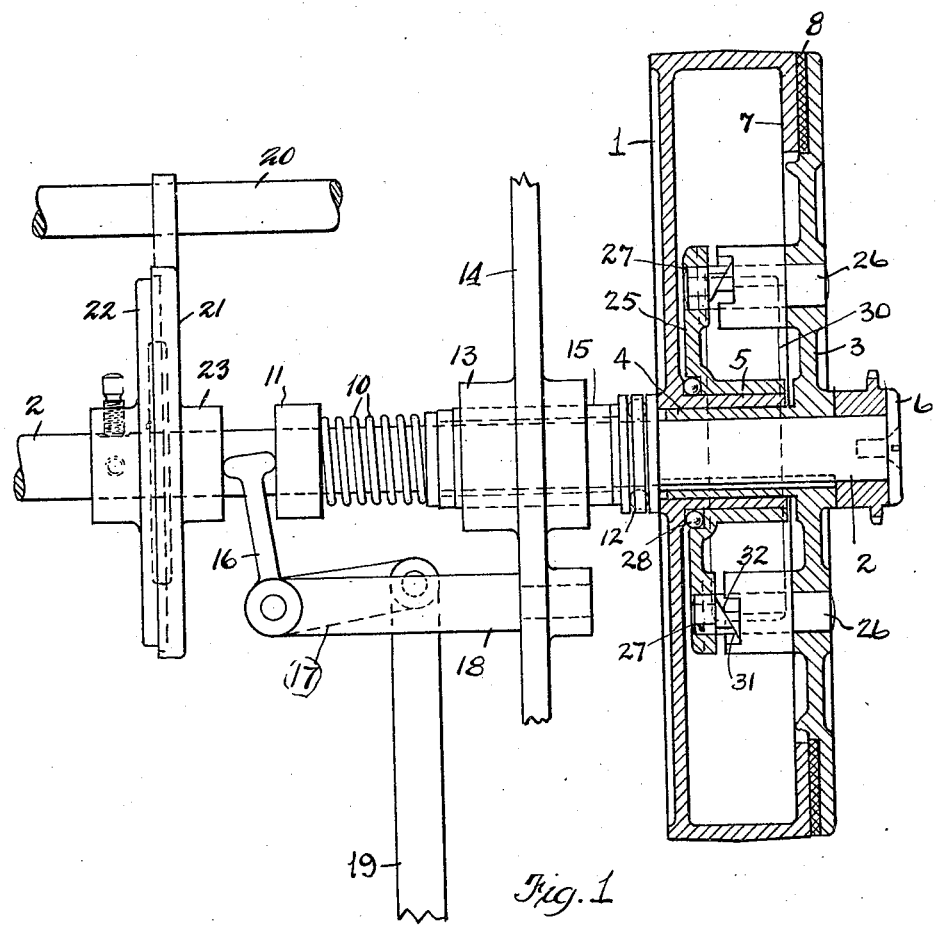

Patented Aug. 13, 1929.

1,724,588

UNITED STATES PATENT OFFICE.

HANS HONIGMANN, OF CLEVELAND, OHIO, ASSIGNOR TO THE CHANDLER AND PRICE COMPANY, OF CLEVELAND, OHIO, A CORPORATION OF OHIO.

DRIVE MECHANISM.

Application filed August 14, 1926. Serial No. 129,152.

The present improvements have more particular regard to a variable speed drive wherein a driving member rotating at a constant rate of speed may be caused to turn a driven member at the same or a selected slower speed, as desired, within limits. The object of the invention is to provide a simple and compact mechanism of the type in question and one that will have a minimum number of operating parts so that there is little likelihood of the mechanism getting out of order. A further object is to permit variation in speed to be readily effected without interrupting the operation, while at the same time the adjustment is sufficiently sensitive so that the speed of the driven member may be regulated to a nicety.

The invention further comprehends a braking device so arranged as to be operable conjointly with the control of the driving mechanism proper. In other words when the driving mechanism is entirely disconnected, the braking device will be automatically thrown into action so as to immediately stop the driven member.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is partly a front elevation and partly a vertical central section through the present improved driving mechanism with associated braking device and conjoint control; Fig. 2 is a sectional view of the driving mechanism proper similar to that shown in Fig. 1 but showing a slight modification in construction; Fig. 3 is a section through such mechanism at right angles to that of Fig. 2, as indicated by the line 3—3, Fig. 2; and Fig. 4 is a sectional view of a detail, the plane of such section being indicated by the line 4—4, Fig. 3.

The driving member 1 in the illustrative construction of the mechanism shown in the drawings is in the form of a belt pulley 1, power being transmitted thereto by means of a belt (not shown) from any convenient source. It will be understood, of course, that a gear driven member may be equally well substituted for such belt pulley. The driven member of the mechanism is shown as a shaft 2 upon which said belt pulley 1 is rotatably mounted, except as it is frictionally clutched thereto through the mechanism now to be described. Such driving member is also free to move slightly in a direction longitudinally of said shaft. The driven member may, of course, take the form of any rotatable element that bears a corresponding relation to the driving member.

Keyed onto the end of shaft 2 is a disk 3, upon the hub 4 of which the hub 5 of the belt pulley 1 is mounted in the manner hereinbefore described; in other words, such belt pulley is not directly mounted on the shaft. A plate 6 attached to the end of the latter serves to retain disk 3 against endwise movement, but, as indicated above, the hub of the belt pulley is not only rotatable but likewise shiftable longitudinally on the hub of the disk.

The diameter of the disk is substantially the same as that of the pulley and the latter is formed with an inwardly directed flange 7 against which the adjacent face of the disk or rather an annulus 8 of friction material, attached to such face, is adapted to bear. The pulley is normally pressed towards the disk so as to maintain frictional contact therewith by means of a compression spring 10 that surrounds the shaft 2 and lies between a shiftable collar 11 thereon and a thrust bearing 12 that is introduced between the corresponding end of the spring and the hub 5 of the belt pulley 1.

It will be noted that in the construction illustrated in Fig. 1, in order that the spring may be located clear of a bearing 13 formed in a part 14 of the supporting frame of the mechanism, an intermediate sleeve 15 is introduced between the spring and said thrust bearing 12. On the other hand, as shown in Fig. 2, where the shaft is supported in a different manner, the spring may lie with its one end in juxtaposition, i. e., pressing against said thrust bearing.

The amount of pressure thus exerted by the spring may be varied in any suitable way as for example by an oscillatory fork 16 that forms one arm of a bell crank 17 mounted in a bracket 18 projecting from the frame 14. Said bell crank is arranged for operation through a connecting rod 19 from a point removed from the driving mechanism, it being obvious that upon pulling down upon said rod, the sleeve 11 will be forced to the right, thereby correspondingly compressing spring 10, while upon movement of the rod in the opposite direction, the resiliency of the spring itself assisting in such movement, the parts of the drive mechanism affected by the spring may be substantially entirely relieved of any pressure whatever.
Slidably supported as from a rod or bar 20, suitably fixed to the machine frame, is a disk-like friction brake member 21 so disposed as to be adapted to contact with a complementary brake disk 22 that is non-rotatably mounted on shaft 2. Said brake member 21 is formed with a hub-like projection 23 that surrounds the shaft a short distance away from sleeve 11 and the upper end of fork 16 lies between such hub and sleeve, as clearly shown in Fig. 1. As a result of the foregoing construction and arrangement of parts, when the bell crank 17 is rocked in a counter-clockwise direction, not only is the pressure on spring 10 relieved, but as a final stage the brake member 21 is forcefully pressed against brake member 22 whereby rotation of shaft 2 may be entirely and promptly stopped.

Reverting to the description of the drive mechanism proper, it will be noted that such mechanism includes a third member 25 in addition to the driving member 1 and the disk 3, said member 25 being non-rotatively secured to the disk by means of two pins 26 that project from the latter in a direction parallel to the shaft 2 and slidably engage apertures 27 in said member 25. A series of balls 28 interposed between member 25 and the pulley 1, adjacent the hub of the latter, constitutes a thrust bearing and otherwise prevents lateral contact between said member and pulley. As a result of the foregoing construction, it will be seen that member 25 is rotatably carried around with the disk 3 and thus with shaft 2, but said member is free to partake of the longitudinal shifting movement of the pulley 1 irrespective of whether the flange 7 of the latter be in frictional engagement with the disk or not.
Such frictional engagement is automatically controlled, within the limit set by the degree of compression to which spring 10 is subjected, by means of two oscillatory weighted levers 30 that are pivotally mounted on the respective pins 26, as best shown in Fig. 3. Adjacent its inner end each such pin is formed with a cam surface 31 that engages with an opposed cam surface 32 formed on the adjacent face of disk 25. These cam surfaces may be integral with the parts in question, as shown in Fig. 1, or they may be formed on separate studs 31ª and 32ª fixedly secured to such parts respectively, as shown in Figs. 2 and 3. The disposition and arrangement of these cam surfaces is such that as the weighted levers 30 swing outwardly from the inner positions they are shown as occupying in the several figures of the drawing, they tend to force the driven member 1 and the disk 3 apart and to a corresponding degree will affect the frictional engagement of these two members. A very slight amount of such separation will sufficiently relieve the pressure of the friction element 8 on the disk 3 against flange 7 of the pulley to cause slippage between the disk and pulley, while if carried to the limit, the effect of the outward movement of the weighted levers will be entirely to disengage such disk from the pulley.

The degree of compression of spring 10, it will be seen, serves to control the action of the weighted levers through the complementary cams 31 and 32 in thus separating the driven from the driving member, and such spring may be adjusted by almost imperceptible degrees. As a result the construction of my improved variable speed drive permits a gradual and extremely sensitive change in speed to be secured from a driving member without any interruption of the drive or any shock. Such driving mechanism is accordingly specially suited for use in driving printing presses and other types of machinery where a variation in speed is desirable but where ordinary types of variable speed drives are objectionable for reasons that will be evident.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of coaxial, rotary driving and driven members adapted to have frictional engagement with each other, a spring tending normally to retain said members in such engagement, means adapted to vary the action of said spring, and oscillatory, weighted levers interposed between said members and movable non-axially thereof arranged and constructed to cam said members apart as said levers are swung outwardly by centrifugal action.

2. In mechanism of the character described, the combination of a shaft constituting the driven member, a driving member rotatably mounted on and also longitudinally shiftable of said shaft, a disk keyed onto said shaft and adapted to have frictional engagement with said driving member when the latter is moved towards said disk, means tending thus to move said member, and interposed, oscillatory, weighted levers movable non-axially of said shaft arranged and constructed to cam said member and disk apart as said levers are swung outwardly by centrifugal action.

3. In mechanism of the character described, the combination of a shaft constituting the driven member, a driving member rotatably mounted on and also longitudinally shiftable of said shaft, a disk keyed into said shaft and adapted to have frictional engagement with said driving member when the latter is moved towards said disk, means tending thus to move said member, a carrier member longitudinally shiftable with said driving member and connected to rotate with said disk, and oscillatory, weighted levers interposed between said carrier member and disk, said levers being arranged and constructed to cam said carrier member, and thus said driving member, away from said disk as said levers are swung outwardly by centrifugal action.

4. In mechanism of the character described, the combination of a shaft constituting the driven member, a driving member rotatably mounted on and also longitudinally shiftable of said shaft, a disk keyed onto said shaft and adapted to have frictional engagement with said driving member when the latter is moved towards said disk, means tending thus to move said member, a carrier member longitudinally shiftable with said driving member, pins lying parallel with said shaft and serving to connect said carrier member to rotate with said disk, and weighted levers oscillatorily mounted on said pins between said carrier member and disk, said levers having cam engagement with one such adjacent part, whereby as said levers are swung outwardly by centrifugal action, they force said carrier member, and thus said driving member, away from said disk as said levers are swung outwardly by centrifugal action.

5. In mechanism of the character described, the combination of a shaft constituting the driven member, a driving member rotatably mounted on and also longitudinally shiftable of said shaft, a disk keyed onto said shaft and adapted to have frictional engagement with said driving member when the latter is moved towards said disk, a coil spring surrounding said shaft in juxtaposition to said member, a brake member fixed to said shaft beyond said spring, an externally supported brake member between the latter and said first brake member, an actuating element adapted upon movement in one direction to compress said spring and in the other direction to press said second brake member against the first, and means operative by centrifugal force for controlling frictional engagement between said driving and driven members.

Signed by me this 12 day of August, 1926.

HANS HONIGMANN.